United States Patent
Ku et al.

(10) Patent No.: US 7,908,387 B2
(45) Date of Patent: Mar. 15, 2011

(54) LOOKUP SERVICE SYSTEM IN JINI-BASED HOME NETWORK SUPPORTING IEEE1394 AND TCP/IP

(75) Inventors: Tai-Yeon Ku, Busan (KR); Dong-Hwan Park, Daegu (KR); Kyeong Deok Moon, Daejeon (KR); Chae Kyu Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 2034 days.

(21) Appl. No.: 10/462,807

(22) Filed: Jun. 17, 2003

(65) Prior Publication Data

US 2004/0103183 A1 May 27, 2004

(30) Foreign Application Priority Data

Nov. 25, 2002 (KR) .................. 10-2002-0073447

(51) Int. Cl.
*G06F 15/16* (2006.01)
(52) U.S. Cl. .................. 709/230; 709/246; 709/249
(58) Field of Classification Search .................. None
See application file for complete search history.

(56) References Cited

U.S. PATENT DOCUMENTS

| | | | |
|---|---|---|---|
| 6,694,440 B1 * | 2/2004 | Ishibashi .................. 713/310 |
| 6,751,221 B1 * | 6/2004 | Saito et al. .................. 370/392 |
| 6,977,939 B2 * | 12/2005 | Joy et al. .................. 370/401 |
| 7,136,399 B2 * | 11/2006 | Lanigan et al. .................. 370/517 |
| 7,150,017 B1 * | 12/2006 | Vogl et al. .................. 718/102 |
| 7,251,675 B1 * | 7/2007 | Kamakura et al. .................. 709/204 |
| 7,340,612 B1 * | 3/2008 | Durand et al. .................. 713/182 |
| 7,458,082 B1 * | 11/2008 | Slaughter et al. .................. 719/328 |
| 2001/0009547 A1 * | 7/2001 | Jinzaki et al. .................. 370/390 |
| 2001/0014881 A1 * | 8/2001 | Drummond et al. .................. 705/43 |
| 2003/0188027 A1 * | 10/2003 | Liu et al. .................. 709/249 |
| 2004/0103183 A1 * | 5/2004 | Ku et al. .................. 709/223 |
| 2007/0002886 A1 * | 1/2007 | Lanigan et al. .................. 370/432 |
| 2009/0010177 A1 * | 1/2009 | Vogl et al. .................. 370/253 |

FOREIGN PATENT DOCUMENTS

| KR | 2002-40959 | 5/2002 |
|---|---|---|
| KR | 2002-51569 | 6/2002 |

OTHER PUBLICATIONS

P. Johansson, IPv4 over IEEE 1394, Congruent Software, Inc., RFC 2734, pp. 1-29.*
Ku et al.; "A JAVA based home network middleware Architecture supporting IEEE 1394 and TCP/IP"; IEEE Transactions on Consumer Electroics; vol. 48; No. 3; Aug. 2002.

* cited by examiner

*Primary Examiner* — David E England
(74) *Attorney, Agent, or Firm* — Lowe Hauptman Ham & Berner LLP

(57) ABSTRACT

In a lookup service system in a JINI-based home network supporting both IEEE1394 and TCP/IP, a service provider proxy DB stores proxy information of TCP/IP-based and IEEE1394-based service providers registered for a lookup service (LUS). A stream link channel handler (SLCH) performs a channeling of data transmitted/received between IEEE1394-based and TCP/IP network-based devices. An IEEE1394 event manager included in an event manager of the LUS dynamically reconfigures IEEE1394-based service information and manages changes of an IEEE1394 network state. An IEEE1394 bus manager receives IEEE1394 network events redefined by an IEEE1394 event manager and maintains and updates an IEEE1394 network topology and a GUID map.

20 Claims, 9 Drawing Sheets

FIG.5

| SERVICE PROVIDER | CLIENT | NETWORK TYPE | SERVICE TYPE | SLCH PATICIPATION | QUEUE TYPE |
|---|---|---|---|---|---|
| TCP | TCP | RMI | TCP | No | - |
| TCP | IEEE1394 | RMI 1394RMI | 1394 | Yes | TCP1394 1394TCP |
| IEEE1394 | TCP | RMI 1394RMI | TCP | Yes | TCP1394 1394TCP 1394UDP |
| IEEE1394 | IEEE1394 | 1394RMI | 1394 | No | - |

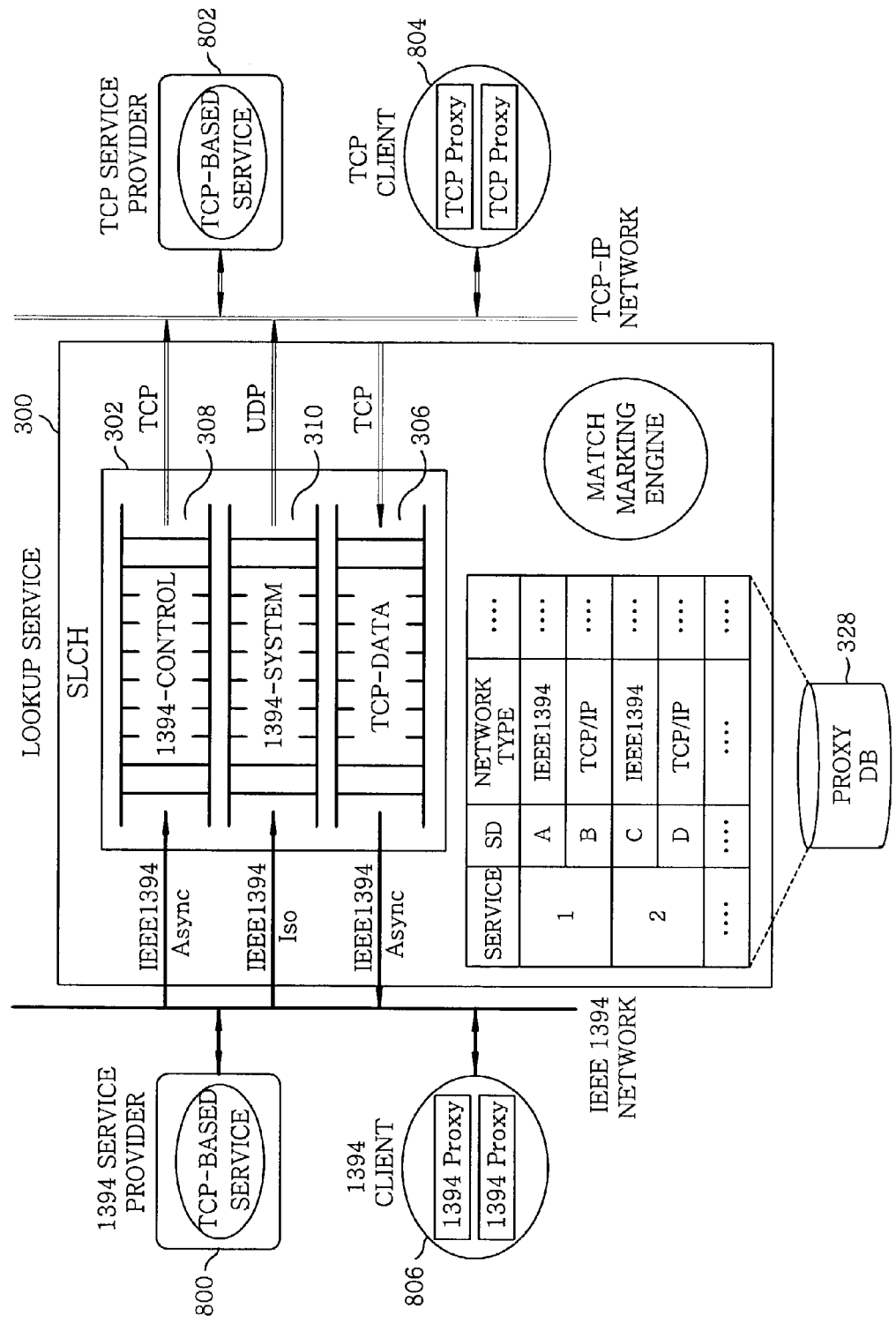

LOOKUP SERVICE SYSTEM IN JINI-BASED HOME NETWORK SUPPORTING IEEE1394 AND TCP/IP

FIELD OF THE INVENTION

The present invention relates to a Java Intelligent Network Infra-structure (JINI) network; and, more particularly, to a lookup service system in a JINI-based home network supporting IEEE1394 and TCP/IP.

BACKGROUND OF THE INVENTION

A conventional JINI is a Java-based network technology proposed by Sun Microsystems, which identifies and uses an apparatus for providing desired services regardless of a base protocol, wherein the technology has been developed to be employed in a home network and an office network. Since the JINI uses the Java technology, every device for providing a JINI service has a Java virtual machine (JVM). Further, communication between devices is carried out based on a remote method invocation (RMI) middleware. An operation of a conventional JINI technology is described as follows. Services provided by each device having the Java virtual machine are registered for a lookup service (LUS). Next, another device on a network requests a device, which is capable of providing a desired service among the services registered for the LUS to provide the desired service. Then, the corresponding device provides the requested service.

For example, when a device such as a digital camera, a network printer and so on is connected to a network, services provided by, e.g., the digital camera and the network printer, i.e., taking pictures, outputting the pictures and the like, are registered for the LUS. Then, devices requiring such services request the services from the digital camera and the network printer and then are provided with corresponding services. The JINI technology can provide an effective distributed network due to communication through the RMI, mobility of a code based on the Java technology and independent characteristics of a platform. However, it is difficult to guarantee QoS (Quality of Service) of multimedia data because of characteristics of TCP/IP.

Therefore, a JINI Surrogate scheme for supporting an IEEE1394 interface technology has been suggested in order to transceive isochronous data such as the multimedia data. However, the JINI surrogate scheme has problems in that advantages of the JINI technology are not provided and only IEEE1394 interface is used.

The IEEE1394 interface technology acknowledged by IEEE in 1995 provides an interface of digital AV devices such as a DTV, a DVC, a digital set top box and so on. Such technology is widely used for peripheral devices of a computer such as a CD-ROM and a hard disk. Further, the technology is being employed in home electronics such as a digital TV and a DVCR. In this case, IEC61883 is used as a standard for using IEEE1394. The standard defines a protocol for establishing a connection between devices to transceive AV data and assigning channels. A home audio video interoperability (HAVi) based on IEC61883 is a middleware performing similar functions with the JINI by using IEEE1394 as a network protocol. The HAVi is effectively used between devices using IEEE1394 interface but is hardly interoperable with TCP/IP, i.e., a protocol of a generalized information mobile device, since a specialized technique is used in IEEE1394.

SUMMARY OF THE INVENTION

It is, therefore, an object of the present invention to provide a lookup service system in a JINI-based home network supporting IEEE1394 and TCP/IP by expanding a JINI network protocol from TCP/IP to IEEE1394.

In accordance with one aspect of the invention, there is provided a lookup service system in a JINI-based home network supporting both IEEE1394 and TCP/IP, the system including: a service provider proxy DB for storing proxy information of TCP/IP-based and IEEE1394-based service providers registered for a lookup service (LUS); a stream link channel handler (SLCH) for performing a channeling of data transmitted/received between IEEE1394-based and TCP/IP network-based devices; an IEEE1394 event manager, which is included in an event manager of the LUS, for dynamically reconfiguring IEEE1394-based service information and managing changes of an IEEE1394 network state; and an IEEE1394 bus manager for receiving an IEEE1394 network event redefined by the IEEE1394 event manager and maintaining and updating an IEEE1394 network topology and a GUID map.

In accordance with another aspect of the invention, there is provided a lookup service method in a JINI-based home network supporting both IEEE1394 and TCP/IP, the method including the steps of: (a) assigning a service ID to an IEEE1394-based device and registering an IEEE1394-based JINI service for a lookup service (LUS); (b) providing proxy information, if a client requests, on a corresponding IEEE1394-based or a TCP/IP-based service provider registered for the LUS; (c) setting up communications using the proxy information between a corresponding client and a service provider in case the client and the service provider are based on a same network; and (d) setting communications between the corresponding client and the service provider by a channeling of the SLCH in case the client and the service provider are based on different networks.

BRIEF DESCRIPTION OF THE DRAWINGS

The above and other objects and features of the present invention will become apparent from the following description of preferred embodiments, given in conjunction with the accompanying drawings, in which:

FIG. 5 represents a proxy information table in a proxy information DB of FIG. 3;

FIG. 8 sets forth a flowchart of a data processing in a stream link channel handler (SLCH) in accordance with a preferred embodiment of the present invention.

DETAILED DESCRIPTION OF THE PREFERRED EMBODIMENTS

Figure 1:
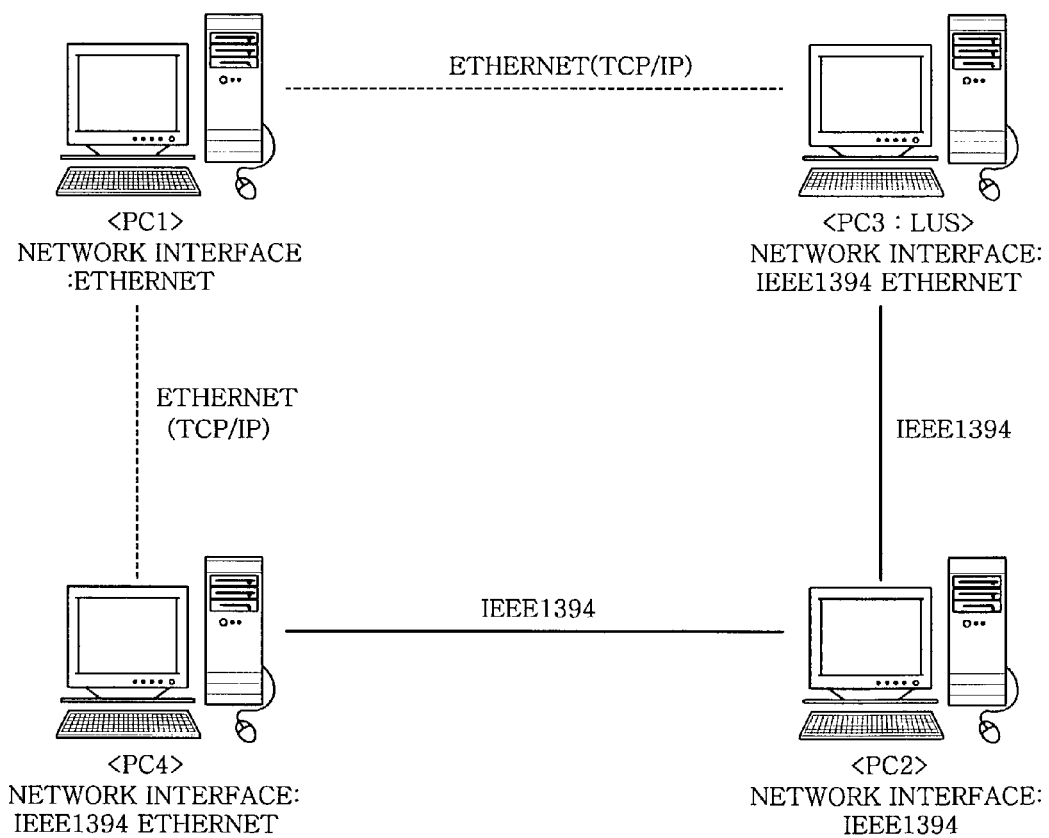
FIG. 1 shows a structure of a home network supporting IEEE1394 and TCP/IP services in accordance with a preferred embodiment of the present invention.

FIG. 1 shows a JINI lookup service system supporting both TCP/IP and IEEE1394 in accordance with a preferred embodiment of the present invention.

As shown in FIG. 1, a PC3 is a lookup service system designed for supporting both TCP/IP-based and IEEE1394-based services in accordance with a preferred embodiment of the present invention. The PC3 converts data for a corresponding base protocol of a PC1 connected to a TCP/IP network and a PC2 connected to an IEEE1394 network to thereby support requests of a TCP/IP-based client and an IEEE1394-based client.

In other words, the PC1 has a TCP/IP-based service provider application or a TCP-IP client application and is provided with an IEEE1394-based service by interoperating with an IEEE1394-based service provider through the lookup service (LUS) PC3. Meanwhile, the PC2 has an IEEE 1394-based service provider application or an IEEE1394 client application and is provided with a TCP/IP-based service by interoperating with a TCP/IP-based service provider through a LUS PC.

Figure 2:
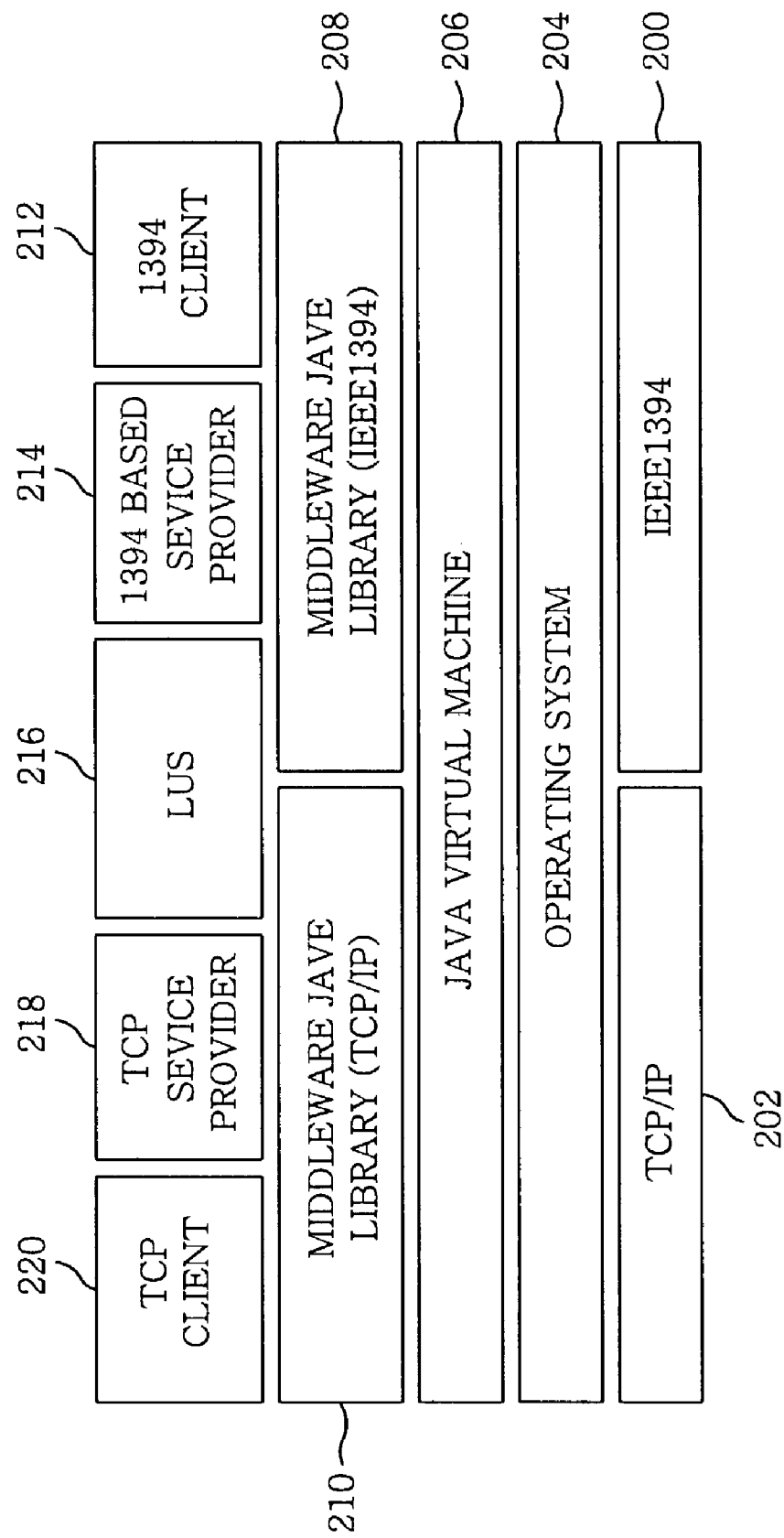
FIG. 2 illustrates a middleware sub-stack architecture in accordance with a preferred embodiment of the present invention.

FIG. 2 illustrates a stack structure of a lookup service system in accordance with a preferred embodiment of the present invention. Referring to FIG. 2, the lookup service system has a network layer of a TCP/IP protocol 202 and an IEEE1394 protocol 200 below an operation system (OS) 204 layer and a Java Virtual Machine (JVM) 206 in order to support TCP/IP and IEEE1394 protocols. Further, the present invention is designed based on Java to be operable in every OS, so that any device can support TCP/IP and IEEE1394.

A Java middleware library is divided into a TCP/IP type and an IEEE1394 type depending on a network type. Accordingly, each of a TCP client 220, a 1394 client 212, a TCP-based service provider 218 and a 1394-based service provider 214 selects either a TCP/IP-based middleware Java library 210 or an IEEE1394-based middleware Java library 208 depending on its own network type, and thus, the lookup service system is designed to use both libraries.

A lookup service (LUS) 216 is a home network middleware for managing a JINI network and controlling a naming service or a directory service of a conventional distributed system. Home network services are stored in the LUS 216 in the form of a serialized proxy object.

Figure 3:
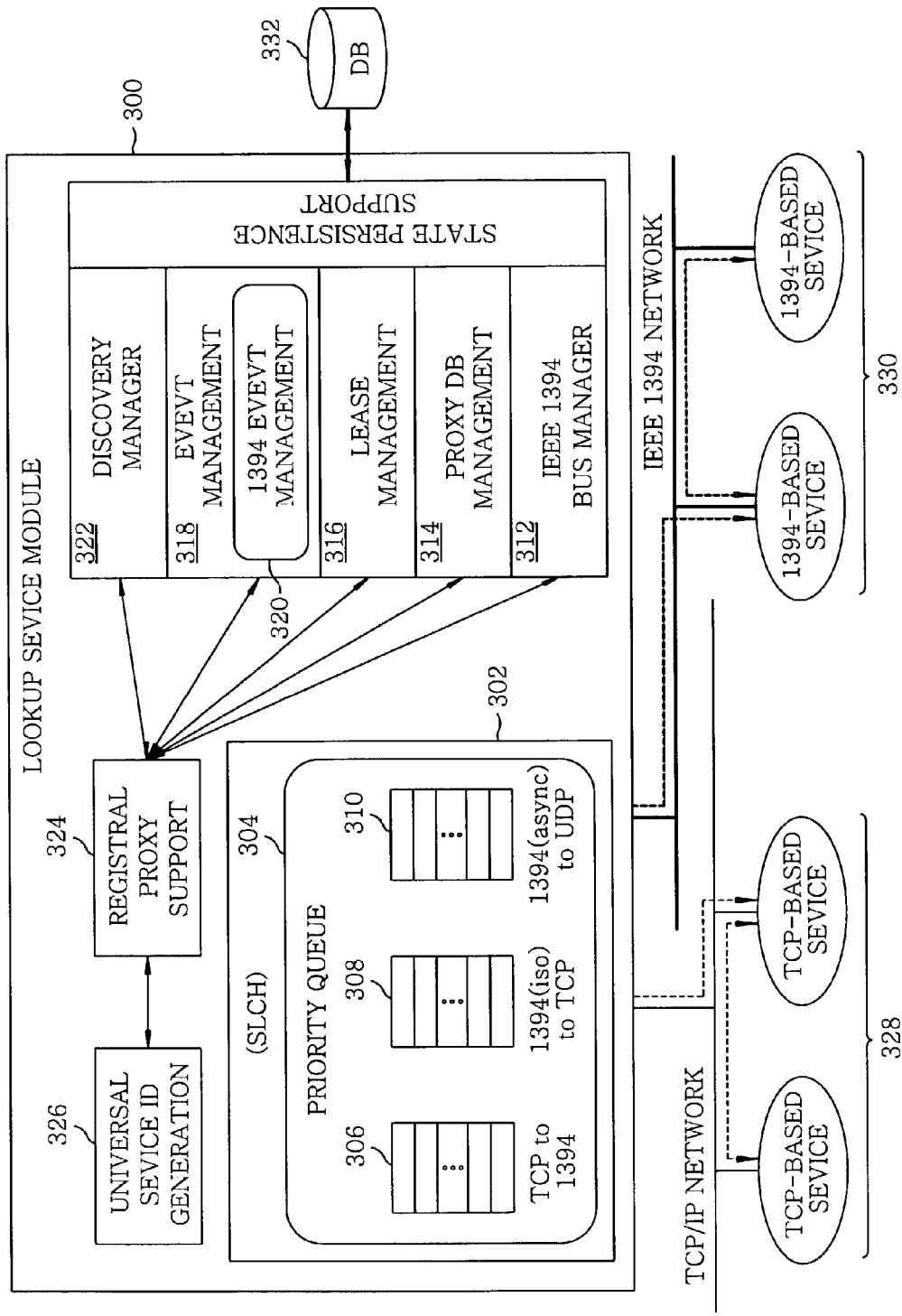
FIG. 3 describes a structure of a lookup service system for supporting IEEE1394 and TCP/IP in accordance with a preferred embodiment of the present invention.

FIG. 3 describes a structure of a software module of the lookup service system. Referring to FIG. 3, a stream link channel handler (SLCH) 302 being part of a lookup service software module 300 functions as an IEEE1394-TCP/UDP channel. The SLCH 302 has a priority queue 304 having three queues: a TCP-data queue 306 transmits data from a TCP/IP network to an IEEE1394 network; a 1394-control queue 308, from an IEEE1394 network to a UDP network; and a 1394-stream queue 310, from an IEEE1394 network to a TCP/IP network.

The three queues have different priorities depending on characteristics of data to be transmitted. If the lookup service system cannot support every channel, another device enabled in the IEEE1394 network can replace the SLCH, and such process is called a third-party channeling. In this case, a load-balancing problem between SLCHs is solved by using a queue-balancing algorithm.

An IEEE1394 RMI is configured of two types of communication channels—a UDP channel for transmitting multimedia data and a TCP channel for transmitting control data. In order to support both an IEEE1394-based service 330 and a TCP-based service 328, the SLCH 302 has three queues in the priority queue 304, i.e., the TCP-data queue 306, the 1394-control queue 308 and the 1394-stream queue 310, as described above with reference to FIG. 3. The TCP-data queue 306, the 1394-control queue 308 and the 1394-stream queue 310 are used for transmitting a packet from TCP to IEEE1394, from IEEE1394 (async) to TCP, from IEEE1394 (iso) to UDP, respectively. The 1394-stream queue 310 is a UDP channel for transmitting stream data and the 1394-control queue 308 is a TCP channel for transmitting control data.

The SLCH 302 uses a rate monotonic scheduling algorithm to manage the priority queue 304. Each queue has a different priority, and especially, the 1394-stream queue 310 has a higher priority than the others. The SLCH 302 continuously monitors a bandwidth of the 1394-stream queue 310 to prevent the 1394-stream queue 310 from wholly occupying a network bandwidth, so that the bandwidth thereof is controlled to be less than 80% of the network bandwidth. In other words, if a client requests the use of a SLCH queue, the SLCH 302 monitors the IEEE1394-stream bandwidth to determine whether the bandwidth is assignable. If the SLCH 302 cannot support the request of the client, the SLCH 302 searches another service as the third-party channeling.

As described above, main functions of the SLCH 302 are to manage the three queues, to dynamically support a connection of a new client and to channel JINI services based on IEEE1394 and TCP. Meanwhile, the lookup service system equally distributes loads between multiple SLCHs.

An IEEE1394 bus manager 312 manages an IEEE1394 bus topology and IEEE1394-related resources such as an isochronous channel and a bandwidth. Further, the IEEE1394 bus manager 312 maps GUID to an IEEE1394 node ID. Whenever an IEEE1394 device is accessed to a home network or the access thereto is terminated, an IEEE1394 bus reset event is occurred to an IEEE1394 network. An IEEE1394 event manager 320 dynamically reconfigures IEEE1394-based service information and checks availability of IEEE1394-based services. Each service requires its own identifier, i.e., a service ID, wherein the service ID is of a random 128 bit number consisting of five fields. The service ID is generated by an algorithm based on the time and demonstrates its uniqueness in case of configuration by an IEEE1394 GUID.

An IEEE1394 network may be dynamically reconfigured depending on changes of a network topology (phase) such as an insertion and a removal of a device. Every device connected to the IEEE1394 network receives a network-reset event from an IEEE1394 protocol. The IEEE1394 event manager 320 included in an event manager of the proposed LUS redefines the received IEEE1394 event to an proposed architecture event.

The IEEE1394 bus manager 312 receives the redefined IEEE1394 network event from the IEEE1394 event manager 320 and then maintains and updates the IEEE1394 network topology and the GUID map. A universal service ID generation unit 326 generates an IP of 128 bit number for every service of the JINI network. In this case, the IP needs to be assigned not only to conventional TCP/IP-based services but also to IEEE1394-based services. In the present invention, the IP of 128 bit number is generated based on an IEEE1394 mechanism at a 1394 device level.

In case a service provider or a client searches a LUS, a discovery manager 322 informs a corresponding device of an existence of the LUS.

A lease manager 316 provides a self-healing function. For example, if a printer has no paper in its own tray or it is disconnected from a network when a client intends to be served by the printer, the client cannot but wait for the completion of the service, without knowing. To prepare such problem, the lease manager 316 performs a self-healing of the printer. A proxy DB manager 314 manages proxy information of TCP/IP-based or IEEE1394-based service providers registered for the LUS. A proxy DB 328 stores therein the proxy information of the service providers registered for the LUS.

Figure 4:
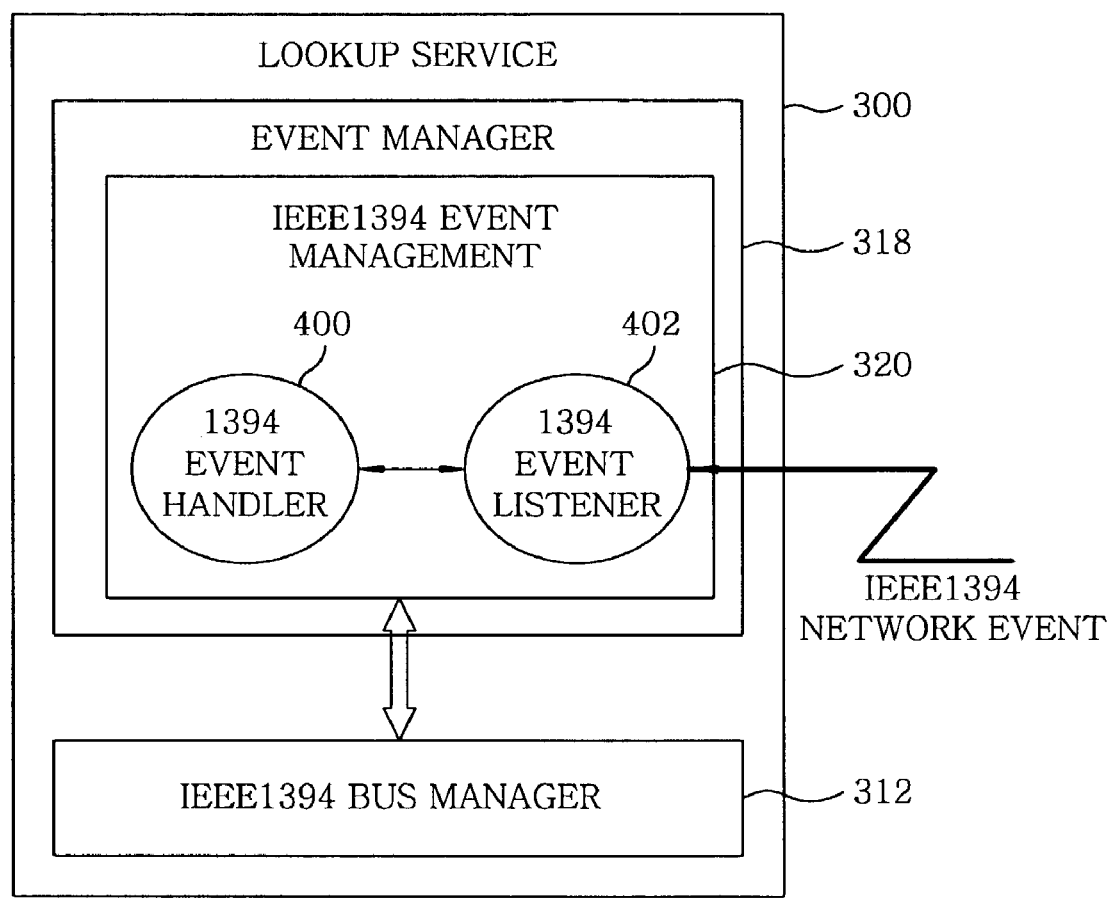
FIG. 4 presents a relation of an IEEE1394 bus manager and an IEEE1394 event manager in the lookup service system of FIG. 3.

FIG. 4 depicts a relation of the IEEE1394 event manager and the IEEE1394 bus manager, wherein the IEEE1394 event manager and the IEEE1394 bus manager are provided in the lookup service system or in a device connected to both IEEE1394 and TCP/IP.

Referring to FIG. 4, the IEEE1394 event manager 320 is divided into an IEEE1394 event listener 402 and an IEEE1394 event handler 400. The IEEE1394 event listener 402 receives IEEE1394 network events and the IEEE1394 event handler 400 posts redefined events to services. Each of the services registers its desired event for the IEEE1394 event listener 402 of the LUS in order to inform the LUS of the desired event. In this way, the IEEE1394 event manager 320 monitors state changes of the IEEE1394 network.

FIG. 5 presents an information table for showing interoperability of IEEE1394 and TCP/IP in accordance with a preferred embodiment of the present invention. Referring to FIG. 5, a proxy type is determined depending on a network type of a client. A service provider generates two types of proxies and registers the proxies for the LUS. The LUS selects a proxy corresponding the network type of the client and transmits the selected proxy. Therefore, the LUS provides a user transparency.

As illustrated in FIG. 5, when a TCP-based service provider communicates with a TCP client, a mechanism such as a conventional JINI service is used without an intervention of the SLCH. On the other hand, when an IEEE1394-based service communicates with a TCP client, the SLCH participates therein. In this case, a TCP-data queue and an IEEE1394-control queue are used, and the client uses an IEEE1394 proxy. A Java RMI protocol serves to connect the SLCH and the TCP-based service and an IEEE1394 RMI protocol functions to connect the IEEE1394 client and the SLCH. In case an IEEE1394-based service provider communicates with the IEEE1394 client, there is no intervention of the SLCH. However, when the IEEE1394-based service provider communicates with the TCP client, the TCP-data queue, a 1394-stream queue and the 1394-control queue of the SLCH are used. The 1394-control queue and the 1394-stream queue transmit control information and stream data, respectively.

Figure 6:
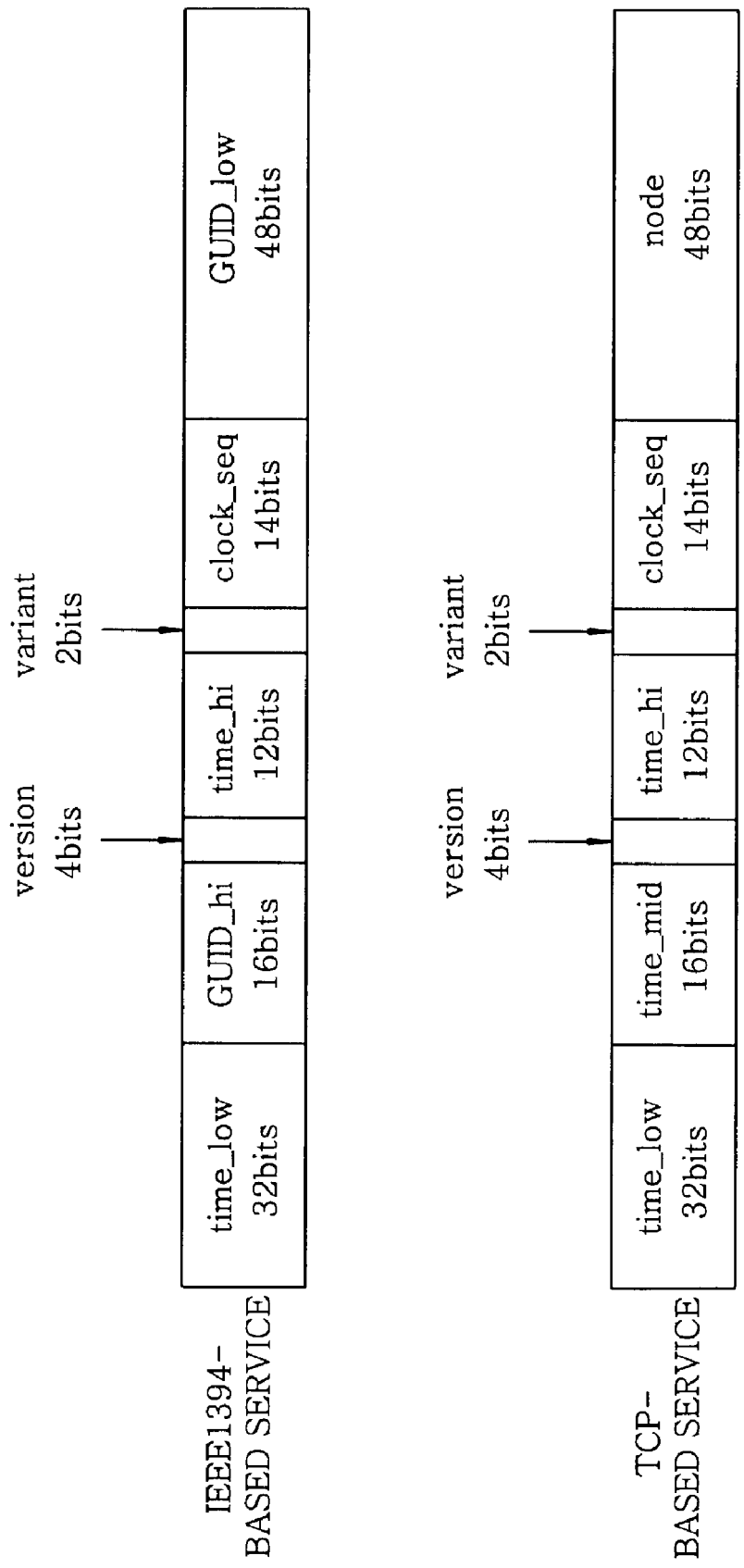
FIG. 6 provides a structure of a universal IP in accordance with a preferred embodiment of the present invention.

FIG. 6 represents a universal ID in a lookup service system in accordance with a preferred embodiment of the present invention, wherein an upper graph is a service ID of an IEEE1394-based service and a lower graph is of a TCP-based service. Referring to FIG. 6, each service has its own identifier, i.e., a service ID, wherein the service ID is a random 128 bit number consisting of five fields.

As shown in the upper graph of FIG. 6, the IEEE1394-based service has a service ID corresponding to a 128 bit number consisting of five fields generated by an algorithm based on the time at instigation together with the IEEE1394 GUID of a device, which practically guarantees its uniqueness. Referring to the lower graph of FIG. 6, there is illustrated a TCP-based service ID generated by using a host address. Even if a same service is newly registered for a near LUS, the client allows the service to be usable. Further, even though same services are registered in a plurality of LUSs, the client allows the services to be recognized as one service.

In order to use a distributed structure instead of a centralized service ID assignment mechanism, when the JINI service is initially registered, a service ID is assigned by the LUS. The JINI service registers with only a null service ID very first time it starts up. From this point on, the onus is on the service to maintain its ID whenever it restarts and use it in all future registrations across lookup services. The service ID is continually used even when network reboots or moves. If the service cannot maintain the service ID, a new service ID should be generated and the JINI network will treat it as a completely new service instance.

FIGS. 7A to 7D illustrate a data processing flow of the lookup service system supporting TCP/IP-based and IEEE1394-based services.

Figure 7A:
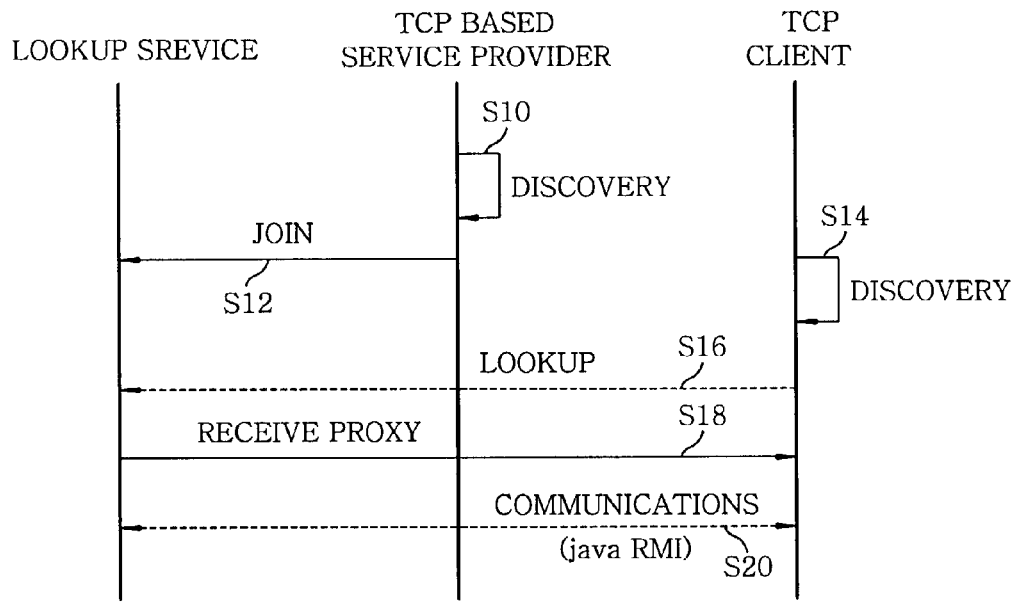
FIGS. 7A to 7D offer a flowchart of an operational control for supporting IEEE1394-based and TCP/IP-based services in accordance with a preferred embodiment of the present invention.

Referring to FIG. 7A, there described a TCP/IP-based JINI service processing. A TCP-based service provider connected to a JINI home network searches a lookup service system through an IP broadcasting at step S10. In this manner, when the TCP-based service provider and the TCP client search the lookup service system, such process is referred to as a discovery.

After the lookup service system is searched through the discovery process, the TCP-based service provider transmits its proxy information to the lookup service system, so that the proxy information can be registered for the lookup service system at step S12. In this case, such registration process is referred to as a join. Accordingly, the TCP-based service provider waits for a service request from the TCP client connected to the JINI network.

Meanwhile, the TCP client searches the lookup service system through the discovery process at step S14. Then, the TCP client requests proxy information of a TCP-based service provider, which is capable of providing a desired service, among TCP-based service providers registered for the lookup service system at step S16. Such information request process is referred to as a lookup. The proxy information indicates ID information transmitted in the form of an object when the TCP-based service provider registers itself for the lookup service system.

Then, the lookup service system searches the proxy information of the corresponding TCP-based service provider requested by the TCP client among the TCP-based service providers registered for the LUS and transmits the proxy information to a client at step S18. Next, the TCP client downloads the proxy information of the corresponding TCP-based service provider and carries out communication using a Java RMI to thereby perform a desired function at step S20.

Figure 7B:
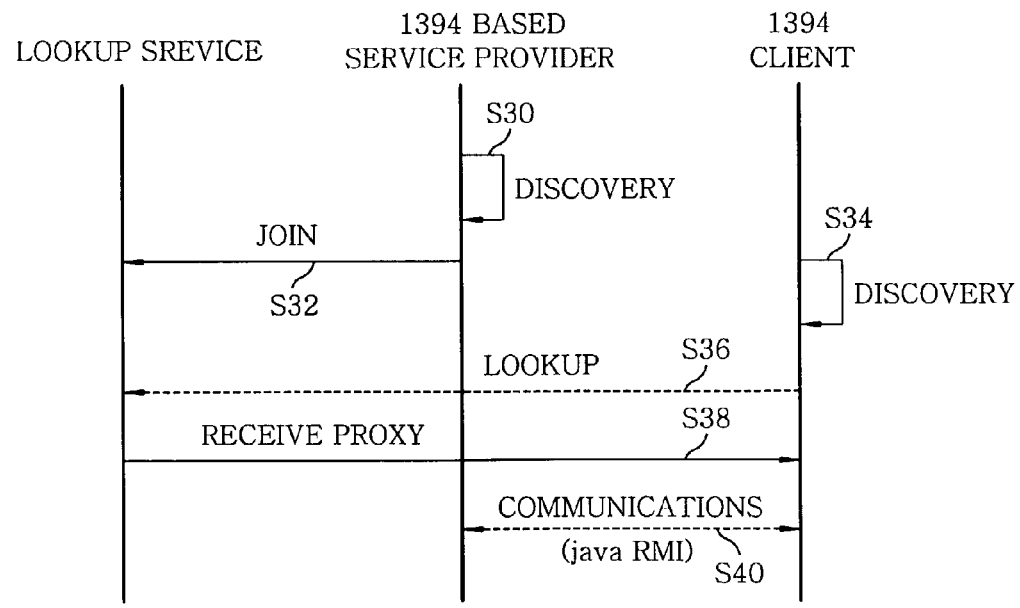

Referring to FIG. 7B, there described an IEEE1394-based JINI service processing. The communications using the LUS of the JINI network between IEEE1394 devices connected by the IEEE1394 network are identically applied to those using the Java RMI between the TCP-based devices in all the communications control process, except that an inventive IEEE1394 RMI is used for communication between IEEE1394 devices in the JINI network.

The Java RMI, which is an application used in communications between the TCP/IP-based devices in the JINI network, is programmed by only a TCP/IP. However, the IEEE1394 RMI in accordance with a preferred embodiment of the present invention can support even communications between the 1394-based devices in the JINI network by interoperating IEEE1394-based devices with the JINI network.

An IEEE1394-based service provider connected to the JINI network searches the lookup service system through an IP broadcasting in the discovery process at step S30 and transmits its proxy information to the lookup service system in the LUS join process thereby registering the proxy information for the LUS at step S32.

An IEEE1394 client also searches the lookup service system through the discovery process at step S34 and thereafter requests proxy information of an IEEE1394-based service provider providing a service requested by a user among the IEEE1394-based service providers registered for the LUS in the lookup process at step S36.

Accordingly, the lookup service system searches the proxy information of the corresponding IEEE1394-based service provider requested by the IEEE1394 client and transmits the proxy information to the client at step S38. The IEEE1394 client downloads the proxy information of the corresponding service provider and operates communication by the IEEE1394 RMI to thereby perform a desired function at step S40.

Figure 7C:
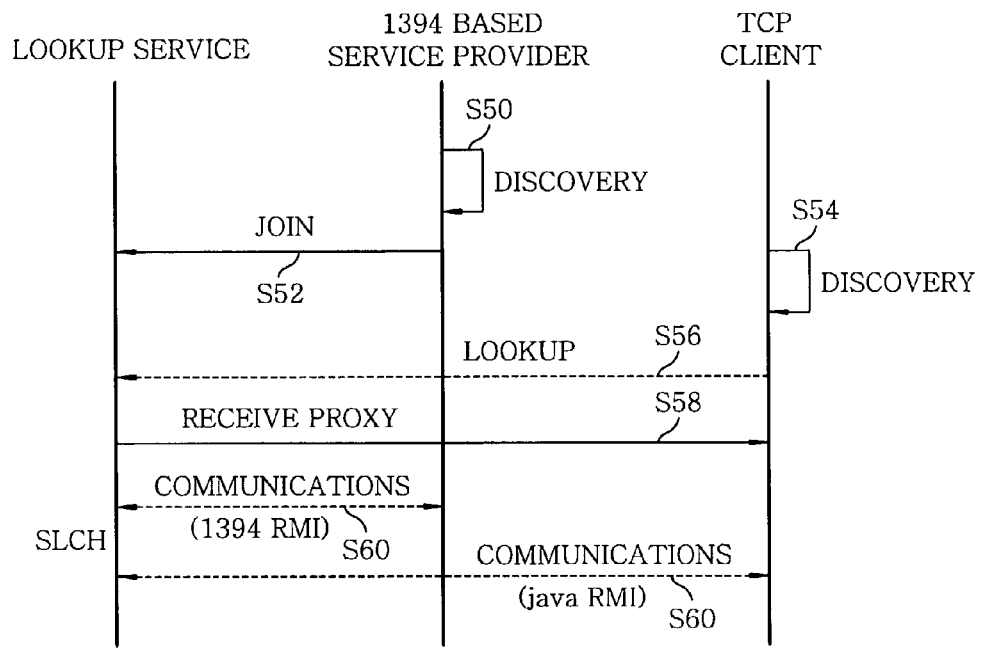

FIG. 7C illustrates a data processing between the IEEE1394-based service provider and the TCP-based client.

When data is transmitted/received between the IEEE1394-based service provider and the TCP-based client, different RMIs are used for communication between the service provider and the client, and therefore, direct communication between devices is difficult. Further, while the IEEE1394-based service provider quickly transmits data to a corresponding TCP-based client through a network, the TCP-based client cannot process the data as quick as the IEEE1394-based service provider.

To that end, the present invention has the SLCH 302 for performing a data interfacing between an IEEE1394 network and a TCP/IP network. The IEEE1394-based service provider and the TCP-based client are not directly connected to a network but connected through the lookup service system. Therefore, the lookup service system has the SLCH 302, i.e., a data channeling module, functioning as a connection path between networks.

The SLCH 302 includes a data priority queue 304 for executing a data channeling between the TCP/IP network and the IEEE1394 network as shown in FIG. 3. When the IEEE1394-based service provider communicates with the TCP-based client, control data is transmitted through a TCP channel by using a 1394-control queue 308 and multimedia data is sent through a UDP channel by using a 1394-stream queue 310.

The TCP-based network has a connection-oriented-TCP protocol and a connectionless-oriented-UDP protocol. The TCP protocol has a comparatively slow data transmission speed but is able to guarantee communication. On the other hand, the UDP protocol has a faster data transmission speed but is not able to guarantee communication. For example, a VOD providing multimedia data transmits control data through the TCP channel and multimedia data through the UDP channel. Accordingly, when the data communication is executed between the IEEE1394-based service provider and the TCP-based client, the SLCH 302 transmits control data through the TCP channel by using the 1394-control queue 308 and multimedia data through the UCP channel by using the 1394-stream queue 310 in order to prevent data transmission of the TCP-based client from delaying.

Referring to FIG. 7C, the IEEE1394-based service provider connected to the JINI network searches the lookup service system through the ID broadcasting in the discovery process at step S50 and transmits its proxy information to the lookup service system in the LUS join process, so that the proxy information is registered for the LUS at step S52.

Further, the TCP-based client searches the lookup service system through the discovery process at step S54 and requests proxy information of an IEEE1394-based service provider providing a service requested by a user among IEEE1394-based service providers registered for the LUS in the lookup process at step S56.

Consequently, the lookup service system searches the proxy information of the IEEE1394-based service provider requested by the TCP-based client and transmits the proxy information to the TCP-based client at step S58. The TCP-based client downloads the proxy information of the corresponding IEEE1394-based service provider and requests a corresponding service. When data is transmitted/received through the SLCH 302 between the IEEE1394-based service provider and the TCP-based client, the SLCH 302 communicates with the IEEE1394 service provider through the 1394 RMI at step S60. Further, the SLCH 302 communicates with the TCP-based client through the Java RMI at step S62.

Figure 7D:
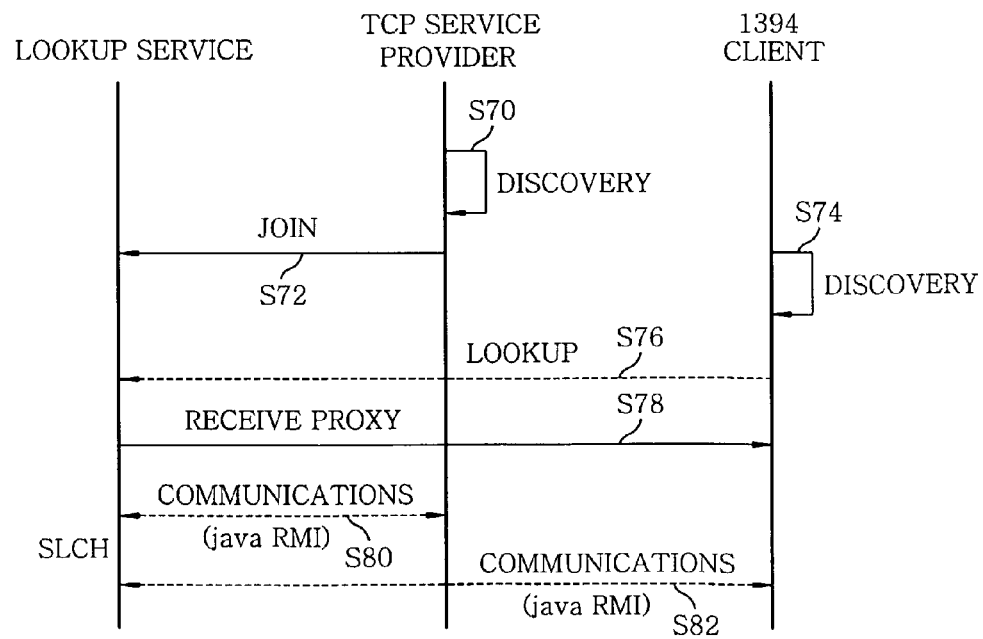

FIG. 7D describes a data processing between a TCP-based service provider and an IEEE1394-based client.

As in the data processing of FIG. 7C, a data channeling of the SLCH 302 is required for a data processing between the TCP-based service provider and the IEEE1394-based client, too. However, since a data transmission speed of the TCP-based service provider is slower than that of the IEEE1394 client, the SLCH 302 transmits TCP data by using only a TCP-data queue 306, i.e., a data queue for use in a 1394 channeling.

The TCP-based service provider connected to the JINI network searches the lookup service system through the IP broadcasting in the discovery process at step S70 and transmits its proxy information to the lookup service system in the LUS join process to thereby register the proxy information for the LUS at step S72.

Further, the IEEE1394 client searches the lookup service system through the discovery process at step S74 and requests proxy information of a TCP-based service provider providing a service requested by a user among TCP-based service providers registered for the LUS in the lookup process at step S76.

Consequently, the lookup service system searches the proxy information of the corresponding TCP-based service provider requested by the IEEE1394 client and transmits the proxy information to the IEEE1394-based client at step S78. The IEEE1394-based client downloads the proxy information and requests the corresponding service. When data is transmitted/received between the TCP-based service provider and the IEEE1394-based client by the SLCH 302, the SLCH 302 communicates with the TCP-based service provider through the Java RMI at step S80. Further, the SLCH 302 carries out communications with the IEEE1394 client through the 1394 RMI at step S82.

FIG. 8 sets forth a data processing between an IEEE1394 network and a TCP/IP network in the SLCH in the lookup service system. As shown in FIG. 8, the SLCH 302 searches proxy DB information 328 of a LUS. When data is transmitted/received between an IEEE1394-based service provider 800 and a TCP-based client 804, 1394 control data is transmitted through a TCP channel by using a 1394-control queue 308 and 1394 multimedia data is transmitted through a UDP channel by using a 1394-stream queue 310. Further, when data is transmitted/received between a TCP-based service provider 802 and an IEEE1394-based client 806, the SLCH 302 transmits the data to the IEEE1394-based client 806 by using only a TCP-data queue 306, i.e., a data queue for use in a 1394 channeling.

As described above, the present invention expands a LUS of a conventional JINI system and configures a home entertainment network in order to provide a structure for providing interoperability of IEEE1394 protocol-based and TCP-based services. In other words, the present invention has a stream link channel handler (SLCH) for performing a channeling between an IEEE1394 network and a TCP/IP network to support an IEEE1394 protocol and a TCP/IP protocol. Further, by using a queue mechanism for exchanging information between TCP/IP and IEEE1394, IEEE1394-based devices can be easily connected to a JINI network. As a result, it is possible to use services between a client and a service provider that support different types of networks.

While the invention has been shown and described with respect to the preferred embodiments, it will be understood by those skilled in the art that various changes and modifications may be made without departing from the spirit and scope of the invention as defined in the following claims.

What is claimed is:

1. A lookup service system in a JINI-based home network supporting both IEEE1394 and TCP/IP, the system comprising:
   a plurality of network based devices;
   a lookup service module stored on said plurality of network based devices, the lookup service module further comprising:
   a service provider proxy DB for storing proxy information of TCP/IP-based and IEEE1394-based service providers registered for a lookup service (LUS);
   a stream link channel handler (SLCH) for performing a channeling of data transmitted/received between IEEE1394-based and TCP/IP network-based devices;
   an IEEE1394 event manager, which is included in an event manager of the LUS, for dynamically reconfiguring IEEE1394-based service information and managing changes of an IEEE1394 network state; and
   an IEEE1394 bus manager for receiving an IEEE1394 network event redefined by the IEEE1394 event manager and maintaining and updating an IEEE1394 network topology and a GUID map
   wherein the lookup service system further comprises
   a universal service ID generation unit for generating a service ID of random 128 bit number on a device basis in order to recognize TCP/IP-based and IEEE1394-based devices connected to the home network,
   wherein the service ID corresponding to an IEEE1394 based service is based on a time of instigation together with the IEEE 1394 GUID, and the service ID corresponding to TCP/IP-based service is based on a time of instigation together with the a host address.

2. The system of claim 1, wherein the IEEE1394 event manager includes:
   an IEEE1394 event listener for receiving IEEE1394 network events; and
   an IEEE1394 event handler for posting redefined events to services.

3. The system of claim 1, wherein the SLCH uses a Java RMI protocol to communicate with TCP network-based devices and an IEEE1394 RMI to communicate with IEEE1394 network-based devices.

4. The system of claim 3, wherein the IEEE1394 RMI, which is a protocol for communications between IEEE1394 devices in the home network, has a UDP channel for transmitting multimedia data and a TCP channel for transmitting control data.

5. The system of claim 4, wherein the SLCH uses a rate monotonic scheduling algorithm.

6. The system of claim 1, wherein the SLCH includes:
   a TCP-data queue for transmitting data from a TCP service provider to an IEEE1394 client;
   a 1394-control queue for transmitting control information from an IEEE1394 service provider to a TCP client through a TCP channel;
   a 1394-stream queue for transmitting multimedia data information from an IEEE1394 service provider to a TCP client through a UDP channel.

7. The system of claim 6, wherein the SLCH transmits control information through a TCP channel by using the 1394-control queue and multimedia data information through a UDP channel by using the 1394-stream queue when data is transmitted/received between the IEEE1394 service provider and the TCP client.

8. The system of claim 7, wherein the SLCH transmits data information through a TCP-data queue when data is transmitted/received between the TCP service provider and the IEEE1394 client.

9. The system of claim 8, wherein the SLCH assigns a higher priority to the 1394-stream queue and monitors a bandwidth of the 1394-stream queue to thereby control the bandwidth thereof to fall into a predetermined range.

10. The system of claim 9, wherein the SLCH allocates less than 80% of a network bandwidth to the 1394-stream queue.

11. A lookup service method in a JINI-based home network supporting both IEEE1394 and TCP/IP, the method, performed by network based devices, comprising the steps of:
   (a) assigning a service ID to an IEEE1394-based device and registering an IEEE1394-based JINI service for a lookup service (LUS),
   wherein a universal service ID generation unit performs the step of generating a service ID of random 128 bit number on a device basis in order to recognize TCP/IP-based and IEEE1394-based devices connected to the home network,
   wherein the service ID corresponding to an IEEE1394-based service is based on a time of instigation together with the IEEE1394 GUID, and the service ID corresponding to TCP/IP-based service is based on a time of instigation together with the a host address;
   (b) providing proxy information, if a client requests, on a corresponding IEEE1394-based or a TCP/IP-based service provider registered for the LUS;
   (c) setting up communications using the proxy information between a corresponding client and a service provider in case the client and the service provider are based on a same network; and
   (d) setting communications between the corresponding client and the service provider by a channeling of the SLCH in case the client and the service provider are based on different networks.

12. The method of claim 11, wherein the step (a) includes the step of registering the IEEE1394-based device as two types of proxies for use in TCP/IP and IEEE1394.

13. The method of claim 11, wherein the step (c) includes the step of carrying out the communications by using an IEEE1394 RMI protocol between the IEEE1394 network-based devices.

14. The method of claim 11, wherein the step (c) includes the step of carrying out the communications by using a TCP/IP RMI protocol between the TCP/IP network-based devices.

15. The method of claim 11, wherein the step (d) includes the steps of:
   (d1) checking a network of a client and a service provider in which communications are requested;
   (d2) transmitting control information by an IEEE1394-control queue of the SLCH to a corresponding TCP/IP client and multimedia data information by an 1394-stream queue of the SLCH to a corresponding TCP/IP client when communications are executed between a TCP/IP client and an IEEE1394-based service provider according to the check result; and
   (d3) transmitting information to a corresponding 1394 client by a TCP data queue when communications are carried out between an IEEE1394 client and a TCP/IP-based service provider according to the check result.

16. The method of claim 15, wherein the step (d2) has the step of transmitting the control information through a TCP channel by an IEEE1394-control queue.

17. The method of claim 15, wherein the step (d2) has the step of transmitting the multimedia data information through a UDP channel by a 1394-stream queue.

18. The method of claim 17, wherein the 1394-stream queue for transmitting the multimedia data information has a higher priority queue and a bandwidth of the 1394-stream queue is set less than 80% of a network bandwidth.

19. The method of claim 15, wherein the step (d2) has the step of communicating the SLCH with the TCP/IP client by a Java RMI protocol and the IEEE1394-based service provider by an IEEE1394 RMI protocol.

20. The method of claim 15, wherein the step (d3) has the step of communicating the SLCH with the IEEE1394 client by an IEEE1394 RMI protocol and the TCP/IP-based service provider by a TCP/IP RMI protocol.

* * * * *